United States Patent
Ferrante

(10) Patent No.: US 11,218,111 B2
(45) Date of Patent: Jan. 4, 2022

(54) OPTICALLY STIMULATED ELECTRON EMISSION APPARATUS

(71) Applicant: Analytical Mechanics Associates, Inc., Hampton, VA (US)

(72) Inventor: Todd Ferrante, Newport News, VA (US)

(73) Assignees: United States of America as Represented by the Administrator of NASA, Washington, DC (US); Analytical Mechanics Associates, Inc., Hampton, VA (US)

(*) Notice: Subject to any disclaimer, the term of this patent is extended or adjusted under 35 U.S.C. 154(b) by 704 days.

(21) Appl. No.: 15/962,827

(22) Filed: Apr. 25, 2018

(65) Prior Publication Data

US 2018/0309405 A1    Oct. 25, 2018

Related U.S. Application Data

(60) Provisional application No. 62/489,873, filed on Apr. 25, 2017.

(51) Int. Cl.
*H02S 50/15* (2014.01)
*G01N 23/2273* (2018.01)

(52) U.S. Cl.
CPC ......... *H02S 50/15* (2014.12); *G01N 23/2273* (2013.01)

(58) Field of Classification Search
CPC ......... H02S 50/15; B24B 49/12; G01N 21/17; G01N 2201/024; G01N 2201/0245; G01N 2201/0648
See application file for complete search history.

(56) References Cited

U.S. PATENT DOCUMENTS

| | | | |
|---|---|---|---|
| 4,590,376 A * | 5/1986 | Smith | G01N 23/227 250/358.1 |
| 5,393,980 A | 2/1995 | Yost et al. | |
| 6,369,590 B1 * | 4/2002 | Cugini | G01R 31/309 324/754.21 |
| 6,369,591 B1 * | 4/2002 | Cugini | G01R 31/309 324/750.14 |
| 6,856,403 B1 | 2/2005 | Welch et al. | |
| 9,182,580 B1 * | 11/2015 | Clawges | G02B 21/0016 |
| 2001/0055116 A1 * | 12/2001 | Maczura | G01J 3/46 356/326 |

(Continued)

OTHER PUBLICATIONS

D. F. Perey A Portable Surface Contamination Monitor Based on the Principle of Optically Stimulated Electron Emission (OSEE), Dec. 1996, NASA Langley Technical Report Server (Year: 1996).*

*Primary Examiner* — Huy Q Phan
*Assistant Examiner* — Dustin R Dickinson
(74) *Attorney, Agent, or Firm* — Mueting Raasch Group

(57) ABSTRACT

An apparatus for inspecting a surface includes a housing and a probe. The housing includes a light source to direct light along a longitudinal axis and a shutter to selectively allow light to pass through to the probe. The probe includes a body portion and a head portion. The head portion of the probe includes a collector to detect photoelectrons emitted from the surface in response to light from the light source impinging on the surface. A proximal portion of the head portion moves relative to a distal portion of the head portion to allow for variations in angle relative to the surface.

14 Claims, 8 Drawing Sheets

(56) References Cited

U.S. PATENT DOCUMENTS

| | | | |
|---|---|---|---|
| 2012/0056093 A1* | 3/2012 | Poteet | G01J 3/0264 250/362 |
| 2012/0112096 A1* | 5/2012 | Meyers | G01N 21/64 250/459.1 |

* cited by examiner

OPTICALLY STIMULATED ELECTRON EMISSION APPARATUS

This application claims benefit of U.S. Provisional Application No. 62/489,873 filed Apr. 25, 2017, entitled "Optically Stimulated Electron Emission Apparatus," which is incorporated herein by reference in its entirety.

This invention was made with Government support under contract NNL12AA09C, awarded by NASA. The Government has certain rights in this invention.

The present disclosure relates optically stimulated electron emission apparatus and methods thereof. More specifically, the present disclosure may be described as relating generally to directing an ultraviolet light solar onto a test surface and detecting a current of photoelectrons generated by the light to perform quality inspections of the test surface.

SUMMARY

One illustrative probe for collecting optically stimulated electron emission to inspect a surface may include a body portion extending between a first end region and a second end region along a longitudinal axis and defining a passageway (e.g., an inner diameter of the passageway of the body portion of the probe is less than 1 inch) extending between the first end region and the second end region. The passageway of the body portion may be configured such that light from a light source travels along the passageway. The head portion may be coupled to the first end region of the body portion and may include a proximal head portion coupled to the first end region of the body portion, and a distal head portion (including, e.g., a foot block configured to directly contact the surface) configured to be positioned proximate the surface and movably coupled to the proximal head portion so as to move relative to the proximal head portion. The distal head portion may include a collector configured to detect photoelectrons emitted from the surface in response to the light from the light source impinging on the surface.

In one or more embodiments, the distal head portion may move relative to the proximal head portion such that the collector is parallel with the surface. Further, in one or more embodiments, the distal head portion may be configured to move axially along the longitudinal axis relative to the proximal head portion.

In one or more embodiments, the head portion may further include a gimbal apparatus extending between the proximal head portion and the distal head portion. The gimbal apparatus may include a gimbal fastener coupled to the distal head portion and configured to move through an aperture defined by the proximal head portion and a gimbal resilient member extending between the proximal head portion and the distal head portion, wherein the gimbal apparatus is configured to allow the distal head portion to move relative to the proximal head portion.

In one or more embodiments, the collector may define a second surface facing the light source and a first surface, opposite the second surface, configured to face the surface. The head portion may include a grid circuit board adjacent the second surface of the collector and a ground circuit board adjacent the first surface of the collector. The grid circuit board may be electrically coupled to the collector to transmit a sensed signal in response to the received photoelectrons emitted from the surface.

In one or more embodiments, the head portion may further include a bellows extending between the proximal head portion and the distal head portion and configured to enclose the head portion.

One illustrative apparatus for inspecting a surface may include a housing defining an interior cavity and extending along a longitudinal axis. The housing may include a light source disposed within the interior cavity and configured to direct light along the longitudinal axis and a shutter positioned away from the light source along the longitudinal axis and configured to selectively allow light from the light source pass therethrough. The illustrative apparatus may further include a probe coupled to and extending from the housing away from the shutter of the housing comprising a body portion and a head portion. The body portion may extend between a first end region to a second end region and may define a passageway (e.g., an inner diameter of the passageway of the body portion of the probe is less than 1 inch) between the first end region to the second end region. The passageway of the body portion may be configured such that light from the light source travels along the passageway when the shutter allows light from the light source to pass therethrough. The head portion may be coupled to the first end region of the body portion and may include a collector configured to detect photoelectrons emitted from the surface in response to the light from the light source impinging on the surface. The head portion may be configurable between an engaged position when the head portion is engaged with the surface and a disengaged position when the head portion is disengaged with the surface. Further, the shutter may be configured to be opened when in the engaged position and the shutter is restricted from opening when in the disengaged position.

In one or more embodiments, the head portion may further include a proximal head portion coupled to the first end region of the body portion and a distal head portion configured to be positioned proximate the surface and movably coupled to the proximal head portion so as to move relative to the proximal head portion. The proximal head portion may be closer to the distal head portion when the head portion is in the engaged position than when in the disengaged position. Further, the head portion may further include a gimbal detect board positioned proximal of the proximal head portion and a gimbal apparatus extending between the proximal head portion and the distal head portion. The gimbal apparatus may be configured to allow the distal head portion to move relative to the proximal head portion, and at least a portion of the gimbal apparatus may contact the gimbal detect board when the head portion is in the disengaged position and the at least a portion of the gimbal apparatus is spaced away from the gimbal detect board when the head portion is in the engaged position.

In one or more embodiments, the shutter may open automatically in response to the head portion being configured in the engaged position.

In one or more embodiments, the illustrative apparatus may further include an initiation button configured to be pressed to actuate the shutter, and the shutter may open to allow light to pass through to the probe when the initiation button is pressed and the head portion is in the engaged position. Further, the shutter may be restricted from opening when the initiation button is pressed and the head portion is in the disengaged position.

One illustrative apparatus for inspecting a surface comprises a housing and a probe. The housing may define an interior cavity and may extend along a longitudinal axis. The housing may include a light source disposed within the interior cavity and configured to direct light along the longitudinal axis and a shutter positioned away from the light source along the longitudinal axis and configured to selectively allow light from the light source pass therethrough. The probe may be removably couplable to (e.g., removably couplable to the housing using a quick-connect interface located proximate the second end region of the body portion of the probe) and extending from the housing away from the shutter of the housing, and the probe may include a body portion and a head portion. The body portion may extend between a first end region to a second end region and define a passageway (an inner diameter of the passageway of the body portion of the probe is less than 1 inch) between the first end region to the second end region. The passageway of the body portion may be configured such that light from the light source travels along the passageway when the shutter allows light from the light source to pass therethrough. The head portion may be coupled to the first end region of the body portion and may include a collector configured to detect photoelectrons emitted from the surface in response to the light from the light source impinging on the surface.

In one or more embodiments, the illustrative apparatus may further include an additional probe removably couplable to and extending from the housing away from the shutter of the housing. The probe and the additional probe may define different form factors. The additional probe may include a body portion extending between a first end region to a second end region and defining a passageway between the first end region to the second end region. The passageway of the body portion may be configured such that light from the light source travels along the passageway when the shutter allows light from the light source to pass therethrough. The additional probe may further include a head portion coupled to the first end region of the body portion. The head portion may include a collector configured to detect photoelectrons emitted from the surface in response to the light from the light source impinging on the surface. Further, the housing may be configured to be removably coupled to one of the probe and the additional probe.

In one or more embodiments, the collector may define a second surface facing the light source and a first surface, opposite the second surface, configured to face the surface. The head portion may include a grid circuit board adjacent the second surface of the collector and a ground circuit board adjacent the first surface of the collector. The grid circuit board may be electrically coupled to the collector to transmit a sensed signal in response to the received photoelectrons emitted from the surface. The head portion may further include a conductive pin extending from the grid circuit board to the ground circuit board, and the conductive pin may be further electrically connected to a housing circuit board located on the housing. The conductive pin may be configured to transmit the sensed signal from the head portion to the housing circuit board.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Exemplary embodiments shall be described with reference to FIGS. 1-7. It will be apparent to one skilled in the art that elements (e.g., apparatus, structures, parts, portions, regions, configurations, functionalities, method steps, materials, etc.) from one embodiment may be used in combination with elements of the other embodiments, and that the possible embodiments of such apparatus and systems using combinations of features set forth herein is not limited to the specific embodiments shown in the figures and/or described herein. Further, it will be recognized that the embodiments described herein may include many elements that are not necessarily shown to scale. Still further, it will be recognized that the size and shape of various elements herein may be modified but still fall within the scope of the present disclosure, although certain one or more shapes and/or sizes, or types of elements, may be advantageous over others. Unless otherwise indicated, all numbers expressing quantities, and all terms expressing direction/orientation (e.g., vertical, horizontal, parallel, perpendicular, etc.) in the specification and claims are to be understood as being modified in all instances by the term "about." The term "and/or" (if used) means one or all of the listed elements or a combination of any two or more of the listed elements.

The present disclosure describes an optically stimulated electron emission (OSEE) apparatus and methods thereof. The OSEE apparatus, or sensor, may be used to detect imperfections on a surface (e.g., a test surface). For example, a carbon fiber surface may be sealed to prevent stray fiber protrusions, and as a result, extraneous seal material (e.g., silicone) or other contaminants may be present on the carbon fiber surface that are not desirable during operation. The OSEE apparatus may be configured to detect those contaminants using a light source and detector. For example, OSEE apparatus and sensors thereof may be described in U.S. Pat. No. 5,393,980 issued on Feb. 28, 1995 and entitled "Quality Monitor and Monitoring Technique Employing Optically Stimulated Electron Emmission (sic)," which is incorporated herein by reference in its entirety. Also, OSEE apparatus and sensors thereof may be described in U.S. Pat. No. 6,856,403 B1 issued on Feb. 15, 2005 and entitled "Optically Stimulated Electron Emission Contamination Monitor and Method," which is incorporated herein by reference in its entirety.

Figure 1:
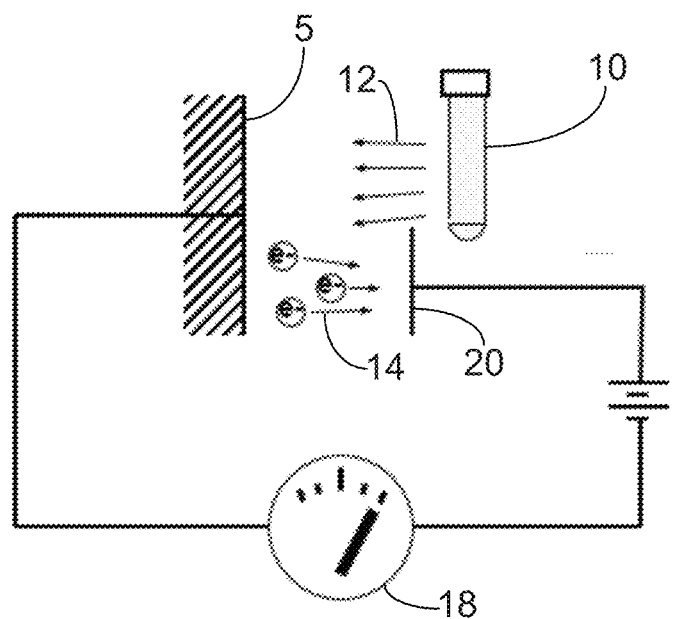
FIG. 1 is a schematic view of a collector detecting photoelectrons emitted from a clean surface in response to a light from a light source impinging on the clean surface.
Figure 2:
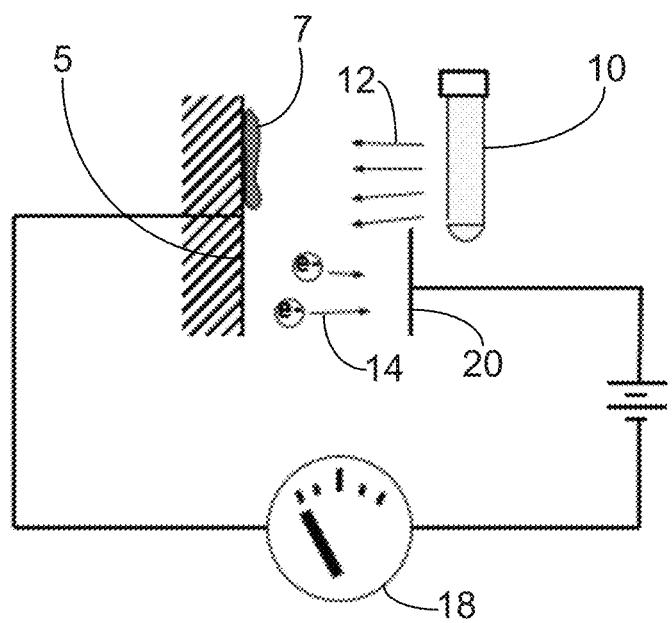
FIG. 2 is a schematic view of a collector detecting photoelectrons emitted from a contaminated surface in response to a light from a light source impinging on the contaminated surface.
Figure 3:
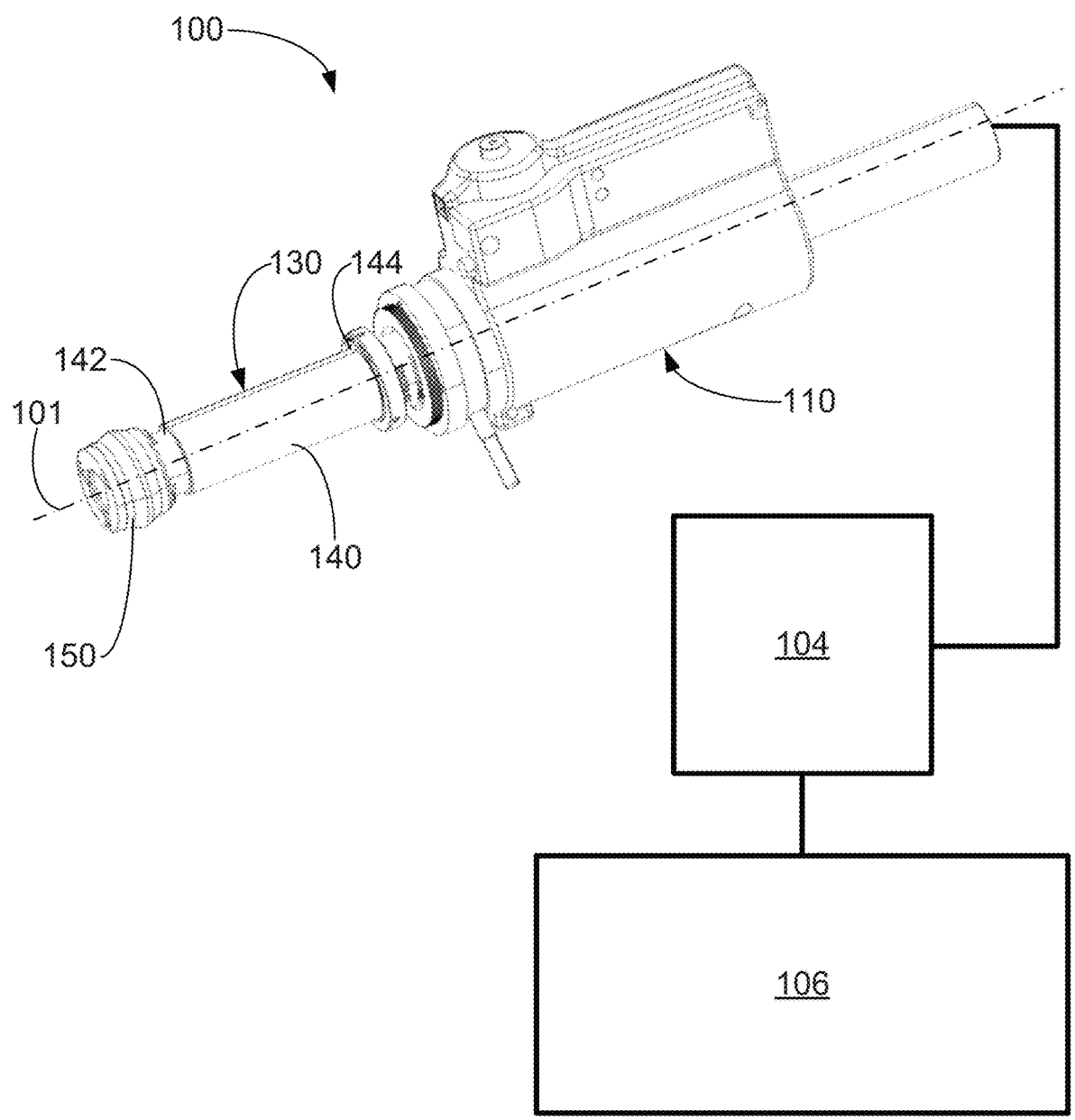
FIG. 3 is schematic illustration of a system including an exemplary optically stimulated electron emission (OSEE) apparatus operably connected to a box and a base station.

A detector of the OSEE apparatus may detect photoelectrons that are generated from a light source (e.g., ultraviolet light) impinging on the surface. The number of photoelectrons detected by the apparatus may be used to determine whether the surface contains contaminants and to what extent. For example, FIGS. 1 and 2 are schematic representations of the OSEE apparatus testing a clean surface (e.g., as shown in FIG. 1) and testing a contaminated surface (e.g., as shown in FIG. 2). Specifically, the OSEE apparatus 100 (e.g., as shown in FIG. 3) may include a light source 10 (e.g., an ultraviolet lamp) that emits light 12 towards a surface 5. In response to the light 12 from the light source 10 impinging on the surface 5, photoelectrons 14 may be emitted from the surface 5 and towards a collector 20 (e.g., the detector of the OSEE apparatus 100). The presence or number of contaminants 7 located on the surface 5 affects the number of photoelectrons 14 that are emitted from the surface 5, in response to the light 12. An increased number of photoelectrons 14 detected by the collector results in a higher reading on a current meter 18 of the OSEE apparatus. Therefore, a higher number of photoelectrons 14 (e.g., as shown in FIG. 1) detected by the collector 20, resulting in a higher reading on the current meter 18, may indicate a clean surface (e.g., surface 5 without contaminants 7) and a lower number of photoelectrons 14 (e.g., as shown in FIG. 2) detected by the collector 20, resulting in a lower reading on the current meter 18, may indicate a dirty surface (e.g., surface 5 including contaminants 7 contained thereon).

Presently, current OSEE sensing apparatus may include an instrument tip that is about 2"×2.5" in cross-sectional size. It may be desirable to use the OSEE apparatus in applications that necessitate smaller probe tip sizes (e.g., less than 1-inch diameter light beam, less than or equal to 0.5-inch diameter light beam, etc.). For example, the surrounding environment in which the OSEE apparatus is used (e.g., positioned, located, inserted, manipulated, etc.). may be restricting (e.g., small, tight, etc.). As such, OSEE sensing apparatus including a probe tip that has, or defines, a smaller cross-section may allow operators to use the OSEE apparatus to take, or measure, readings in these tight quarters. Also, the exemplary OSEE apparatus may be configured to include and allow for interchangeable probe tip sensor heads that are customized or optimized for a particular geometry of sensing application (e.g., angled, curved, differing cross-sections, etc.). Additionally, the interchangeable sensor probe may be desirable for removing and servicing various components of the sensor. Furthermore, the OSEE apparatus and sensors thereof may be reduced in size through various features. For example, lenses and/or reflective surfaces may reduce a larger sized beam of ultraviolet light to a smaller size of usable intensity.

Repeatable positioning of the sensor of the OSEE apparatus relative to the surface being tested or analyzed may be important for reliability of readings. Use of a smaller probe tip may result in a smaller surface area (and, therefore, a smaller area of contact) with which to properly position the probe tip on the surface to be tested. On the other hand, a larger surface area at the point of contact may result in more stability due to a larger area of contact. Further, conventional OSEE apparatus and sensors thereof may have a probe tip that is fixed to the housing of the apparatus, and as such, any movement of the OSEE apparatus and sensor thereof (e.g., the housing that includes a handle) may result in movement of the probe tip, which may alter the readings of the sensor and produce inconsistent results. Therefore, the exemplary disclosure herein describes OSEE apparatus including a smaller probe tip and a probe tip head portion that may move relative to the remainder of the OSEE apparatus housing to accommodate small changes in position, orientation, and angle of the collector/detector relative to the surface to be tested. The movement of the head portion relative to the remainder of the OSEE apparatus housing may assist in aligning the OSEE apparatus to achieve an accurate and consistent reading.

The exemplary sensors or collectors/detectors of the OSEE apparatus may move to accommodate alignment with the surface to be tested in a variety of different ways. For example, a mechanical gimbal may keep, or maintain, an OSEE sensor grid glass (e.g., the collector) in close proximity to and/or at a fixed distance to the surface to be tested and at a desirable angle and/or orientation relative to the surface (e.g., parallel to the surface). The exemplary mechanical gimbal may produce repeatable positioning of the grid glass relative to the surface under test, which therefore may produce more reliable readings. As such, the gimbal may allow the sensor head to remain in intimate or constant contact with the surface to be tested while allowing the device to be manually operated because, e.g., the gimbal may dampen any movements of a manual operator. Additionally, the movement of the gimbal may indicate that the device is properly aligned and send a signal that a reading of the surface can be taken, whether by a manual operator or an automatic process.

An illustrative OSEE apparatus 100 is shown in FIG. 3 operably connected to a box 104 and a base station 106. The box 104 and the base station 106 may be configured to operate in conjunction with the OSEE apparatus 100 for inspecting a surface, as described herein. For example, the box 104 may include a belt box configured to be attached to the belt of a user and tethered within a close proximity of the OSEE apparatus 100, while the base station 106 may be more stationary and operably coupled to the belt box 104 using a much longer cable. For example, the base station 106 may include a computer processor and/or a purge gas source. Further, the box 104 may be electrically and pneumatically coupled to the OSEE apparatus 100 and the box 104 may be electrically and pneumatically coupled to the base station 106. Therefore, each of the box 104 and the base station 106 may contain a bulk of the electronics and purge gas supply to allow the OSEE apparatus 100 to be smaller and more maneuverable.

The OSEE apparatus 100 may include a housing 110 and a probe 130 extending therefrom. Generally, for example, the housing 110 may include electronics, external attachments, input/output actuators, a light source, etc., while the probe 130 may be configured to be positioned proximate to a surface to be tested and include a sensor head to take readings from the surface. The housing 110 may extend along a longitudinal axis 101. In one or more embodiments, the probe 130 may be removably couplable to the housing 110. For example, the probe 130 may be easily attached to and removed from the housing 110 without damaging either one of the probe 130 or the housing 110. Further, the probe 130 may be removably couplable to the housing 110 such that a first probe may be removed from the housing 110 and a second probe may be coupled to the housing 110.

The probe 130 may be removably couplable to the housing 110 in any suitable way. For example, the probe 130 may be removably couplable to the housing 110 using a "quick-connect" interface between the probe 130 and the housing 110. Additionally, the probe 130 may be removably couplable to the housing 110 both electrically and mechanically to ensure both a robust electrical connection (e.g., to transmit signals between the probe 130 and the housing 110) and structural connection. The removably couplable relationship between the probe 130 and the housing 110 may allow for the probe 130 (including a sensor head contained therein) to be interchangeable, either for servicing, cleaning, or installing differently configured probes (e.g., including different heads and/or sensors) on the same housing 110.

Figure 6A:
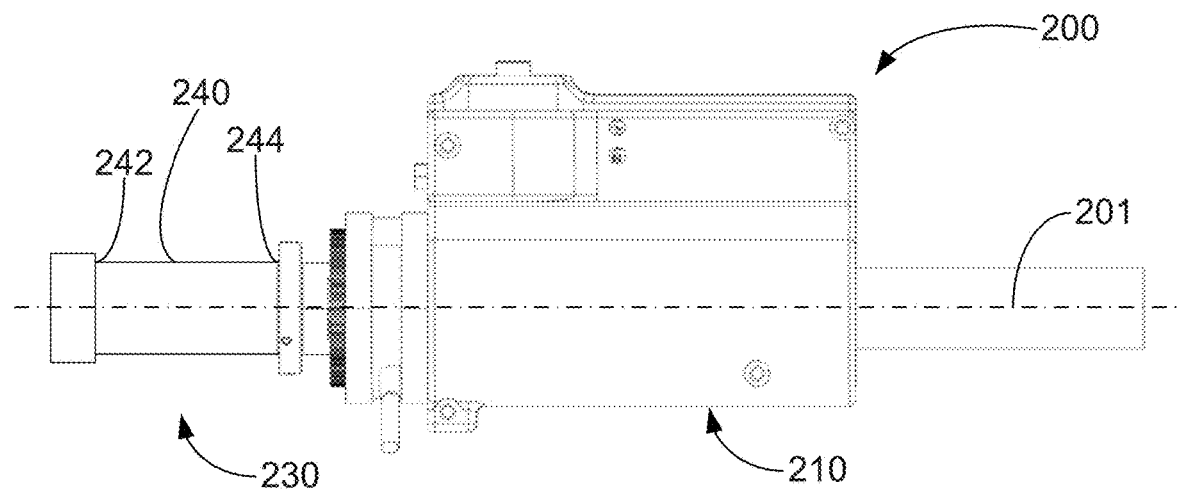
FIGS. 6A-6D are various different probes that may be operably coupled to a housing of an OSEE apparatus.

For example, as shown in FIGS. 6A-6D, the probe 130 may define various shapes and sizes (e.g., defining different form factors). Each of the different probes 130 may be coupled to and removed from the same housing and operate in the same way (e.g., to detect photoelectrons emitted from a surface to be tested). Specifically, as shown in FIG. 6A, an OSEE apparatus 200 may include a housing 210 and a probe 230 extending therefrom along a longitudinal axis 201. The probe 230 may include a body portion 240 extending between a first end region 242 and a second end region 244 along the longitudinal axis 201. The body portion 240 of the probe 230 may extend for a shorter length along the longitudinal axis 201 than the probe 130 as shown in FIG. 3. However, the body portion 240 of the probe 230 may be any suitable length (measured between the first and second end regions along the longitudinal axis). For example, the body portion of the probe may define a length of greater than or equal to about 0.25 inches, greater than or equal to about 0.5 inches, greater than or equal to about 0.75 inches, and greater than or equal to about 1 inch, etc. and/or less than or equal to about 5 inches, less than or equal to about 3 inches, less than or equal to about 2 inches, and less than or equal to about 1.5 inches.

Figure 6B:
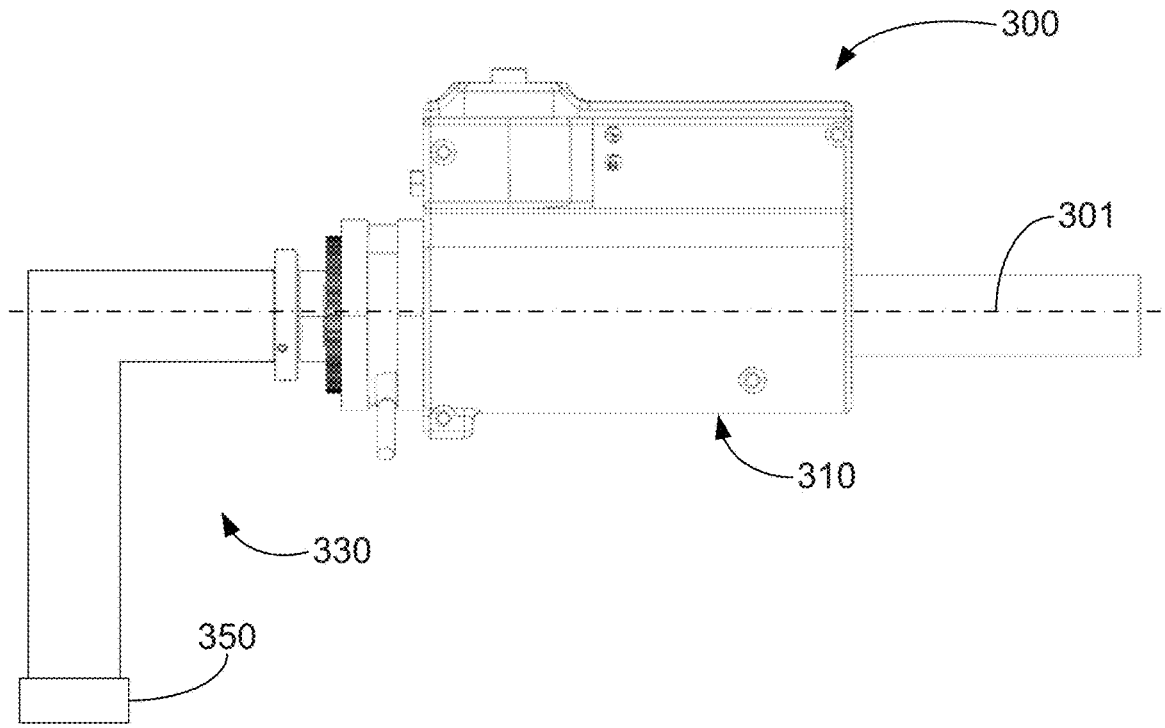

In some embodiments, as shown in FIG. 6B, an OSEE apparatus 300 may include a housing 310 and a probe 330 extending therefrom. The probe 330 may extend for a distance (from the housing 330) along the longitudinal axis 301 and then extend perpendicular to the longitudinal axis 301 as shown. In this embodiment, the probe 330 may include a mirror/reflector at the angle to reflect light from the light source towards the head portion 350.

Figure 6C:
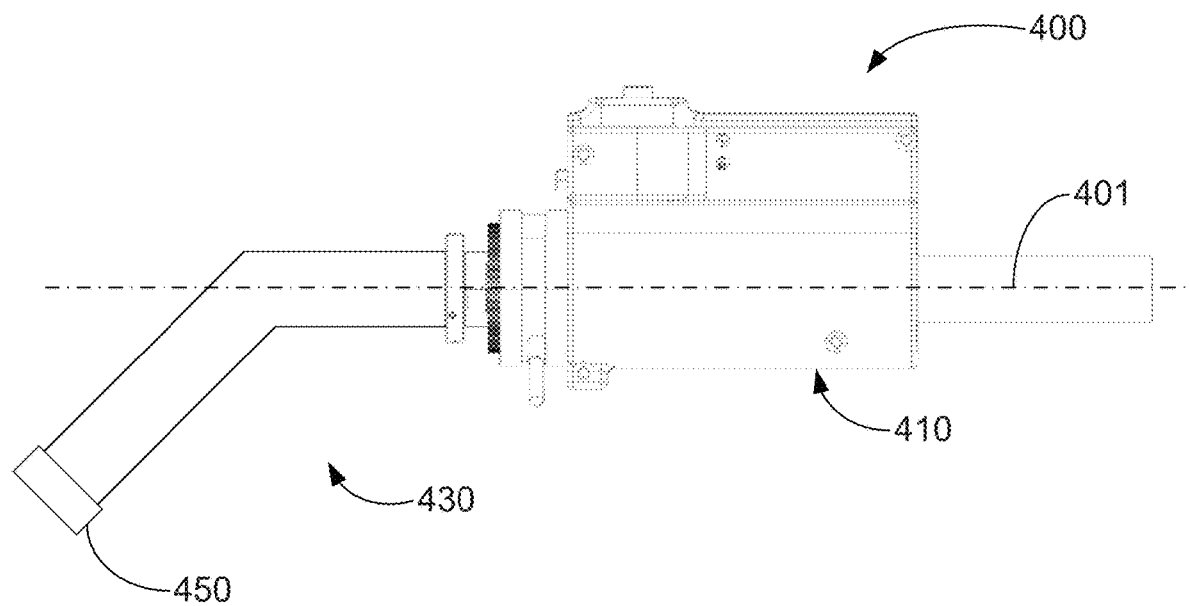

In another embodiment, as shown in FIG. 6C, an OSEE apparatus 400 may include a housing 410 and a probe 430 extending therefrom. The probe 430 may extend for a distance (from the housing 430) along the longitudinal axis 401 and then extend at an angle to the longitudinal axis 401 as shown. The angle at which the probe 430 bends may be any suitable angle (e.g., about a 45-degree angle is shown). In this embodiment, the probe 430 may include a mirror/reflector at the angle to reflect light from the light source towards the head portion 450.

Figure 6D:
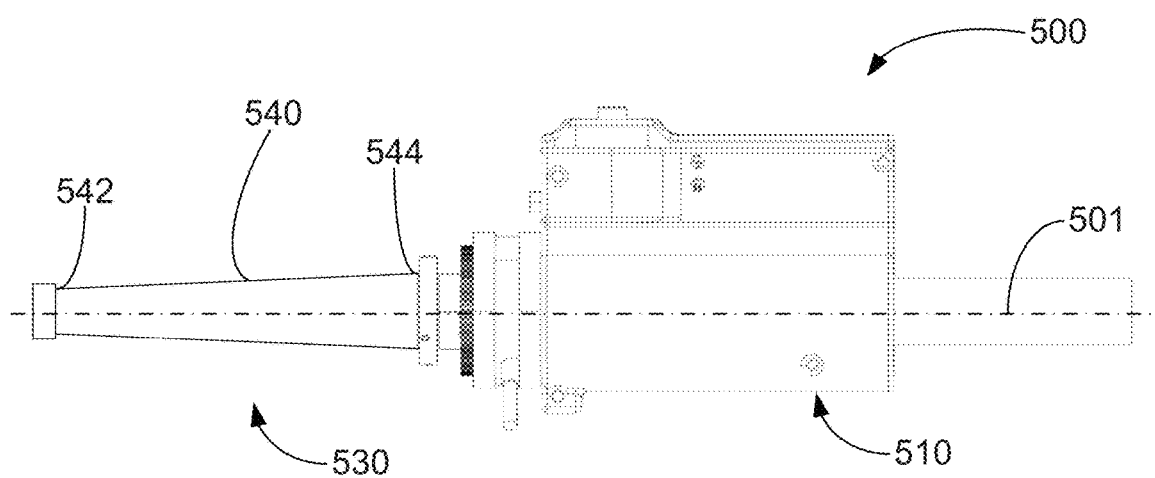

In yet another embodiment, as shown in FIG. 6D, an OSEE apparatus 500 may include a housing 510 and a probe 530 extending therefrom along a longitudinal axis 501. The probe 530 may include a body portion 540 extending between a first end region 542 and a second end region 544 along the longitudinal axis 501. The body portion 540 of the probe 530 may taper from the second end region 544 to the first end region 542. As a result, the probe 530 may be able to access a surface to be tested that is located in a space that has progressively less space as the probe 530 gets closer to the surface.

The probe 130 may include a body portion 140 and a head portion 150 as shown in FIG. 3. For example, the body portion 140 of the probe 130 may extend between a first end region 142 and a second end region 144 (e.g., along the longitudinal axis 101). The housing 110 may be coupled to (e.g., removably couplable to) the second end region 144 of the body portion 140 (e.g., using a quick-connect interface) and the head portion 150 may be coupled to the first end region 142 of the body portion 140. The head portion 150 may include a head sensor or collector configured to be positioned proximate a surface to detect photoelectrons emitted from the surface, as described further herein. Additionally, each of the probes 130 illustrated in FIGS. 6A-6D may include the same components (e.g., body portion 140, head portion 150, etc.) as described herein.

Figure 4:
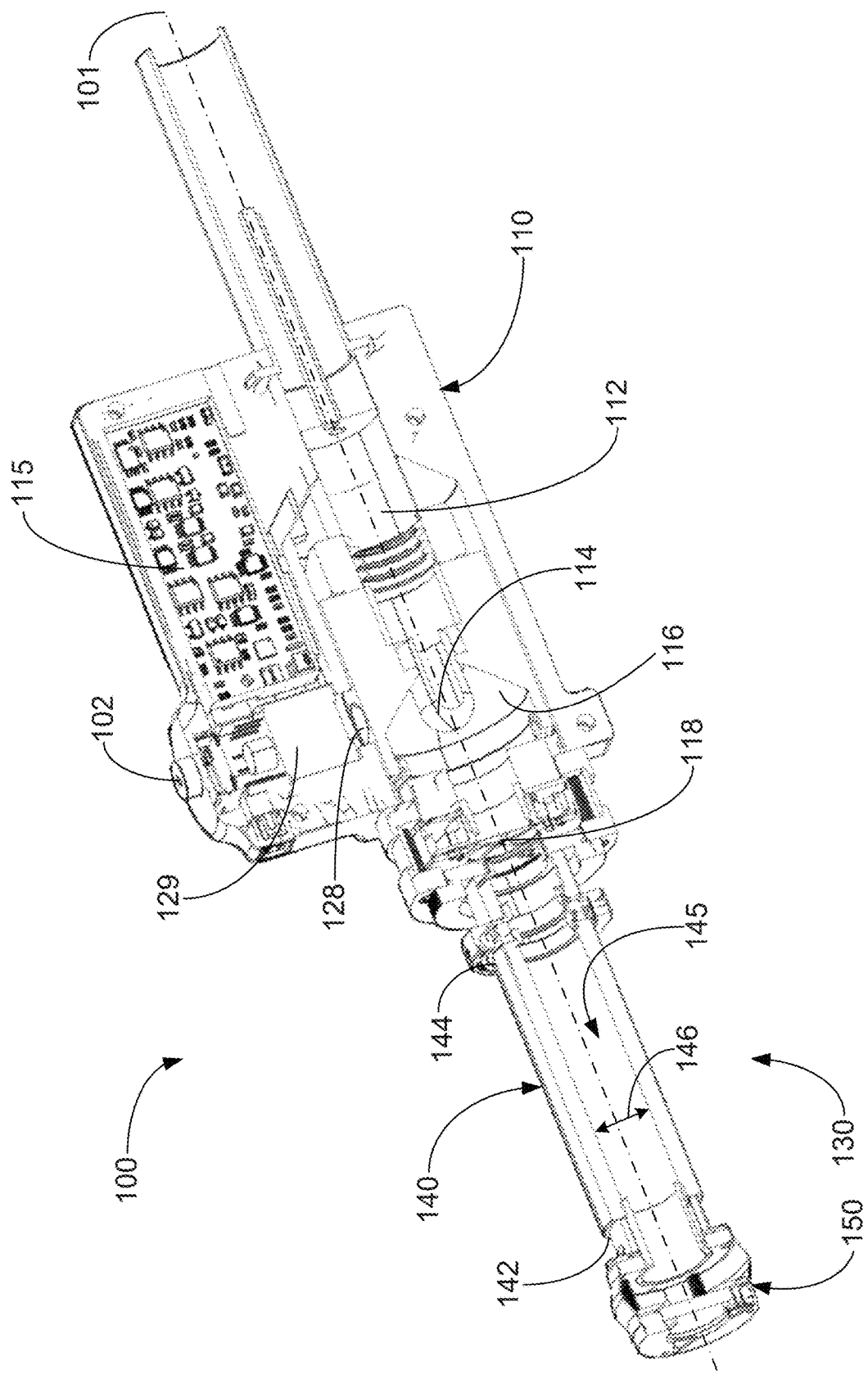
FIG. 4 is a cross-sectional view of the OSEE apparatus of FIG. 3.

FIG. 4 illustrates a cross-sectional view of the OSEE apparatus 100 including a housing 110 that defines an interior cavity 112 extending along the longitudinal axis 101. The housing 110 may include a light source 114 (e.g., an ultraviolet lamp, etc.) disposed within the interior cavity 112 and configured to direct light along the longitudinal axis 101 (e.g., through the interior cavity 112). Further, in one or more embodiments, the housing 110 may include a reflector 116 (e.g., a magnesium fluoride-coated reflector, etc.) proximate the light source 114 to reflect light from the light source 114 through the interior cavity 112 and the probe 130. In one or more embodiments, the housing 110 may also include a light sensor 129 that may be configured to provide a closed loop feedback control of the light source 114 intensity.

The housing 110 may also include a shutter 118 positioned away from the light source 114 along the longitudinal axis 101 and configured to selectively allow light from the light source 114 to pass therethrough (e.g., the shutter 118 may open to allow light to pass therethrough and may close to block or stop light from passing therethrough). In one or more embodiments, the light source 114 may always be "on" (e.g., when the OSEE apparatus 100 is connected to power) such that the shutter 118 controls utilization of the light source 114 by opening and closing the shutter 118 to allow light to travel through the probe 130. Additionally, the housing 110 may include an initiation button 102 (e.g., measurement initiation push button) configured to be pressed/pushed to actuate the shutter 118 (e.g., open the shutter) and allow light to pass through to the probe 130.

Figure 5A:
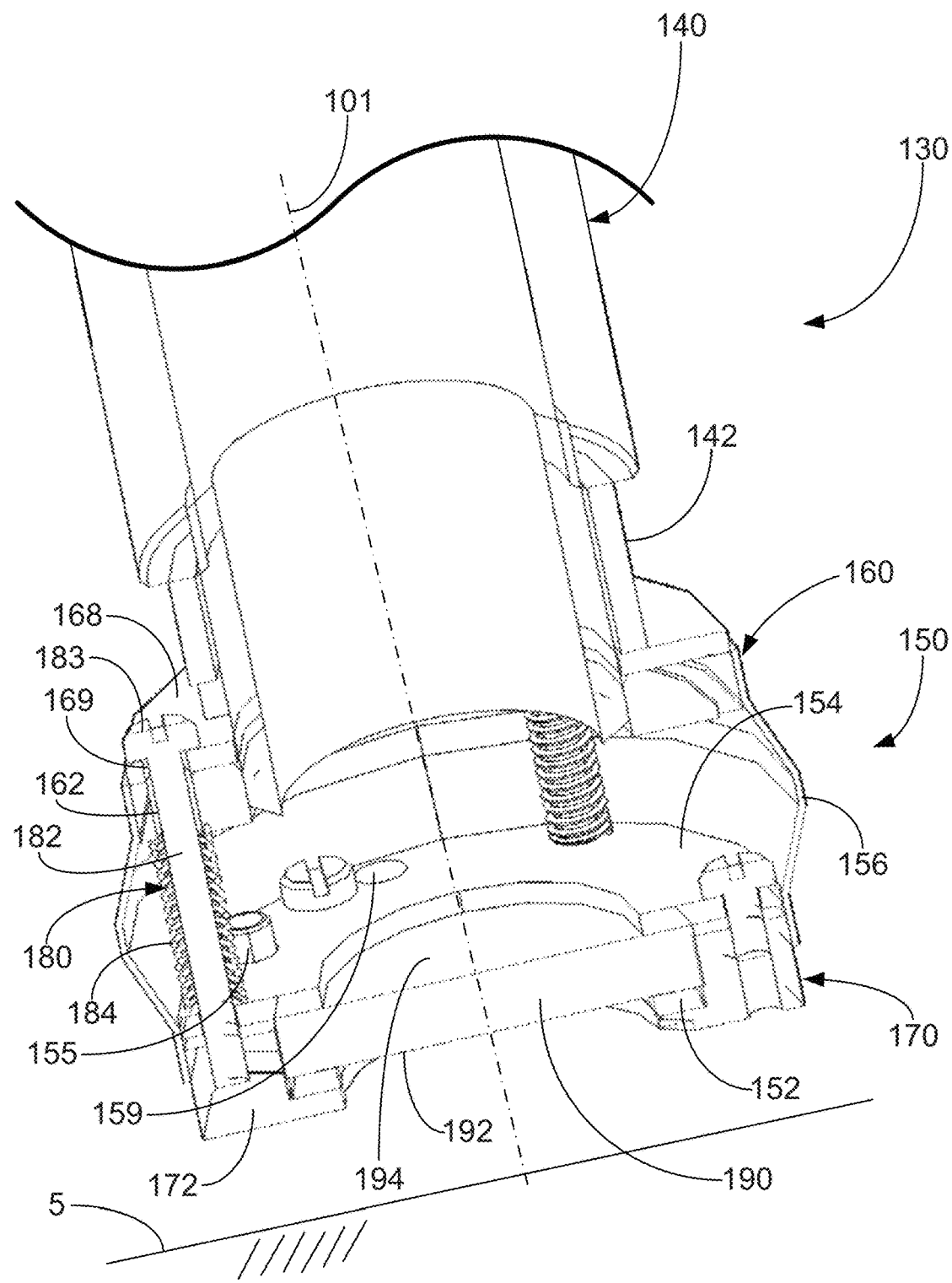
FIG. 5A is an expanded cross-sectional view of a head portion of the OSEE apparatus of FIG. 3 in a disengaged position.

Furthermore, the housing 110 may be connected to a gas source configured to disperse gas (e.g., argon gas) within the interior cavity 112 of the housing 110 to displace humid ambient air (e.g., to prevent corrosion) and the gas may travel through the probe 130 (e.g., to the head portion 150 of the probe 130) when the shutter 118 is open. The housing 110 may include a purge port 128 that is configured to allow extra gas to exit the housing 110 (e.g., to ensure a constant flow of gas through the system). Similarly, the head portion 150 may define a gas port 159 (e.g., as shown in FIG. 5A) configured to purge gas (e.g., allow gas to exit) located in the probe 130 (e.g., within the head portion 150). In some embodiments, the gas source may be located within the base station 106 and pneumatically coupled to the OSEE apparatus 100 to provide a constant source of gas to the OSEE apparatus 100.

The probe 130 may extend from the housing 110 (e.g., along the longitudinal axis 101) away from the shutter 118 of the housing 110. The body portion 140 of the probe 130 may define a passageway 145 configured such that light from the light source 114 may travel along the passageway 145 when the shutter 118 allows light from the light source 114 to pass therethrough (e.g., when the shutter 118 is open). The passageway 145 may define an inner diameter 146 of less than or equal to 2 inches, less than or equal to 1.5 inches, less than or equal to 1 inch, less than or equal to 0.5 inches, etc. An outer diameter of the probe 130 may be very similar to the inner diameter 146, thereby creating a small cross-sectional profile (e.g., about 2 inches×2 inches, about 1.5 inches×1.5 inches, about 1 inch×1 inch, about 0.5 inches× 0.5 inches, etc.) for the probe 130 to be used in tight spaces. The head portion 150 of the probe 130 may be coupled to the first end region 142 of the body portion 140 and in fluid communication with the passageway 145 of the body portion 140.

Figure 5B:
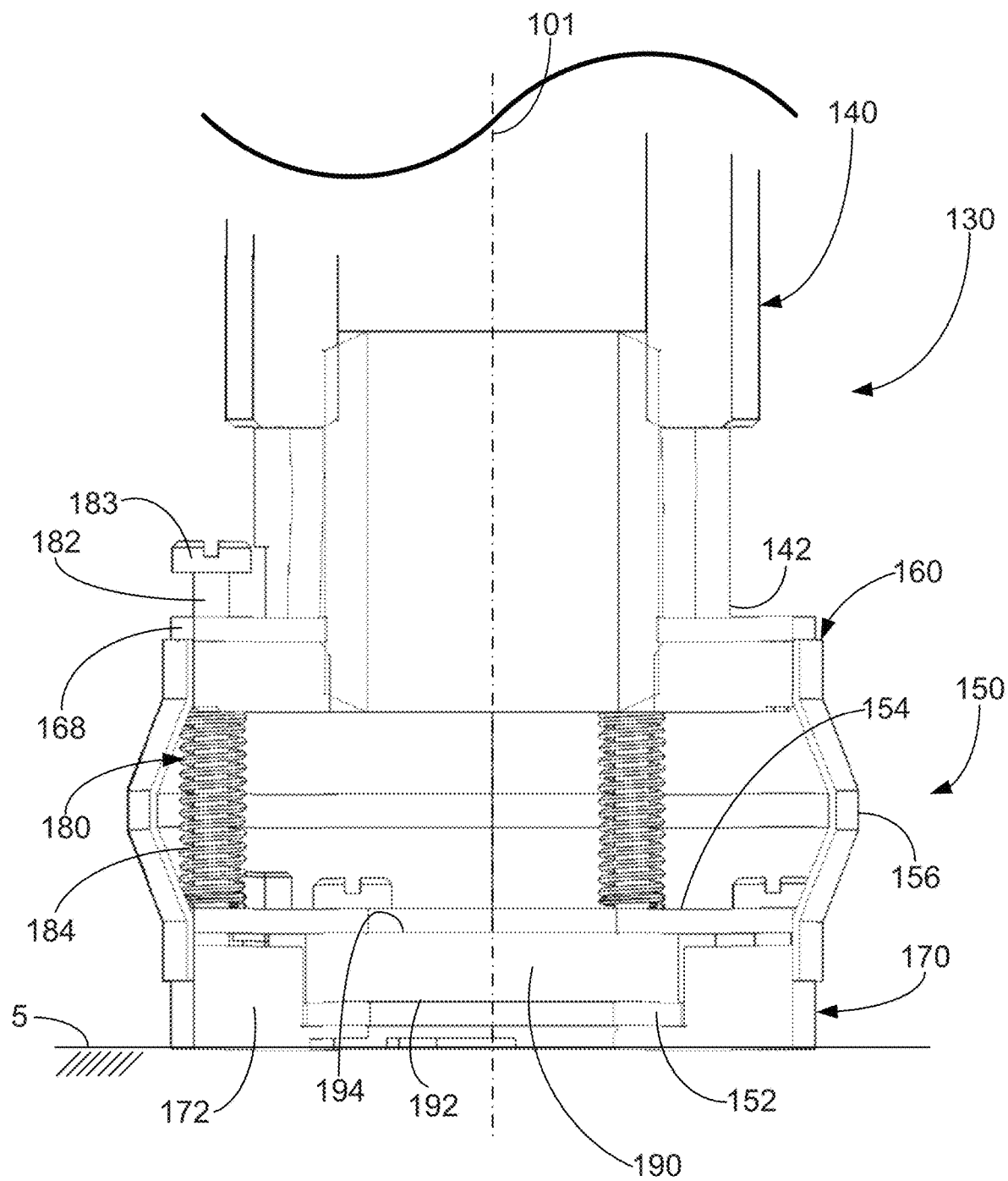
FIG. 5B is an expanded cross-sectional view of a head portion of the OSEE apparatus of FIG. 3 in an engaged position.

An expanded cross-sectional view of the head portion 150 of the probe 130 is illustrated in FIGS. 5A-5B. The head portion 150 may be configurable between an engaged position (e.g., as shown in FIG. 5B) when the head portion 150 is engaged with a surface 5 to be tested and a disengaged position (e.g., as shown in FIG. 5A) when the head portion is disengaged with (e.g., no contacting) the surface 5. In one or more embodiments, the shutter 118 may be configured to be opened when the head portion 150 is in the engaged position and the shutter 118 may be restricted from opening when the head portion 150 is in the disengaged position. Further, in one or more embodiments, the operation of the initiation button 102 may connected to whether the head portion 150 is in the engaged position or the disengaged position. For example, the initiation button 102 may only actuate the shutter 118 when the head portion 150 is in the engaged position (e.g., because the head portion 150 in the engaged position is indicative of the head portion 150 being properly positioned and "ready"). Specifically, the shutter 118 may open to allow light to pass through to the probe 130 when the initiation button 102 is pressed and the head portion 150 is in the engaged position and the shutter 118 may be restricted from opening when the initiation button 102 is pressed and the head portion 150 is in the disengaged position.

The head portion 150 may include a proximal head portion 160 proximate the body portion 140 of the probe 130 (e.g., coupled to the first end region 142 of the body portion 140) and a distal head portion 170 configured to be positioned proximate the surface 5 to be tested. The distal head portion 170 may be movably coupled to the proximal head portion 160 so as to move relative to the proximal head portion 160. For example, the distal head portion 170 may be configured to move axially along the longitudinal axis 101 relative to the proximal head portion 160. It may be described that, the proximal head portion 160 may be closer to the distal head portion 170 when the head portion 150 is in the engaged position than when in the disengaged position. The relative movement between the proximal head portion 160 and the distal head portion 170 may assist in properly aligning the OSEE apparatus 100 such that light from the light source 114 may impinge on the surface 5 orthogonally (e.g., aligning the light orthogonal to the surface 5 may result in more accurate and consistent test results).

Further, the relative movement between the proximal head portion 160 and the distal head portion 170 may allow for minor fluctuations due to a user (e.g., any shaking of the hand of the user) if the OSEE apparatus 100 is used manually. Therefore, the head portion 150 of the probe 130 may be configured to "self-right" (e.g., to ensure the collector 190 is aligned with the surface 5 when taking a reading) when the head portion 150 is positioned against the surface 5. In other embodiments, the OSEE apparatus 100 may be configured to be placed on a robot to use the device. In such embodiments, there may be a desire for a more automated process of engaging the head portion 150 with the surface 5 and the shutter 118 automatically opening to take a reading (e.g., in response to the head portion 150 being configured in the engaged position).

Further, the head portion 150 may include a collector 190 (e.g., a metalized grid glass, etc.) configured to be positioned proximate the surface 5 and configured to detect photoelectrons emitted from the surface 5 in response to the light from the light source 114 impinging on the surface 5. Specifically, the distal head portion 170 may include the collector 190. The collector 190 may define a second surface 194 facing the light source 114 and a first surface 192, opposite the second surface 194, configured to face the surface 5. Further, the head portion 150 may include a gas port 159 (e.g., argon port) configured to purge gas located in the probe 130 and may expose both sides of the collector 190 (e.g., the first and second surfaces 192, 194) to the purge gas. Additionally, the distal head portion 170 may include a foot block 172 configured to directly contact the surface 5. The foot block 172 defines a flat surface that may contact the surface 5 in a consistent and repeatable way. Because both the collector 190 and the foot block 172 are fixedly positioned within the distal head portion 170, there is a known spatial relationship between the collector 190 and the foot block 172 such that the collector 190 may be consistently positioned away from the surface 5 to be tested when the foot block 172 is in direct contact with the surface 5.

The relative movement between the proximal head portion 160 and the distal head portion 170 (and thereby the collector 190) may provide a consistent and repeatable distance (and angle) between the collector 190 and the surface 5 that may improve readings of the sensor (via the collector 190) by ensuring that the collector 190 is correctly oriented relative to the surface even when the proximal head portion 160 (and the housing 110 connected thereto) is not perfectly aligned (e.g., the longitudinal axis 101 is not orthogonal to the surface 5). Furthermore, movement between the proximal head portion 160 and the distal head portion 170 may assist in correcting the alignment of the housing 110 (e.g., when the longitudinal axis 101 is not orthogonal to the surface 5). For example, the distal head portion 170 may move relative to the proximal head portion 160 such that the collector 190 may be positioned parallel with the surface 5 and the housing 110 may align after the distal head portion 170 is fully depressed towards the proximal head portion 160.

The distal head portion 170 may be movably coupled to the proximal head portion 160 (which may be fixedly coupled to the body portion 140 of the probe 130) in a variety of different ways. For example, the head portion 150 may include various movable components to provide flexibility in movement between the distal head portion 170 and the proximal head portion 160. In one or more embodiments, the head portion 150 may include a gimbal apparatus 180 positioned or extending between the proximal head portion 160 and the distal head portion 170 to provide relative movement therebetween. Specifically, in one or more embodiments, the gimbal apparatus 180 may include a gimbal fastener 182 (e.g., a gimbal screw) coupled to the distal head portion 170 and configured to move through an aperture 162 of the proximal head portion 162 (e.g., such that the distal head portion 170 and the proximal head portion 160 may move relative to one another). In some embodiments, the apertures 162 may be sized relative to the gimbal fasteners 182 such that the distal head portion 170 may move or shift in a rotational direction (e.g., about the longitudinal axis 101), or a direction perpendicular to the longitudinal axis 101, relative to one another. In other embodiments, the gimbal apparatus 180 may include other elastic elements that may allow the distal head portion 170 to rotate relative to the proximal head portion 160 to, e.g., accommodate small rotational or angle changes of the probe 130.

The gimbal apparatus 180 may also include a gimbal resilient member 184 (e.g., a gimbal spring) extending between the proximal head portion 160 and the distal head portion 170 to bias the proximal head portion 160 and the distal head portion 170 away from each other. In one or more embodiments, the gimbal resilient member 184 may include helical coil springs that hold apart, or bias, the proximal head portion 160 and the distal head portion 170 away from each other and the gimbal resilient members 184 may be coaxial to the gimbal fasteners 182 (e.g., the gimbal resilient members 184 may surround the gimbal fasteners 182). For example, the gimbal resilient members 184 may include metallic helical springs, elastomeric springs, elastomeric sleeves (e.g., surrounding the gimbal fasteners 182), etc.

The gimbal apparatus 180 may allow the distal head portion 170 to move relative to the proximal head portion 160 such that the collector 190 may be properly aligned with the surface 5. In other words, the gimbal apparatus 180 may bias the distal head portion 170 away from the proximal head portion 160 along the longitudinal axis 101 such that, when a force is applied to overcome the bias of the gimbal apparatus 180, the distal head portion 170 may move towards the proximal head portion 160 and assist in aligning the collector 190 (and the OSEE apparatus 100 as a whole). The force applied to the distal head portion 170 may be a result of the head portion 150 being pressed against the surface 5 or configuring the head portion 150 in the engaged position. Further, it may be described that the proximal head portion 160 and the distal head portion 170 define an extended distance therebetween when no force is applied to the distal head portion 170 (e.g., in the disengaged position) and define a collapsed distance therebetween when a force is applied to the distal head portion 170 such that the gimbal apparatus 180 is compressed (e.g., in the engaged position). Further yet, the head portion 150 may define a selected length of travel for which the distal head portion 170 moves when the head portion 150 transitions between the engaged position and the disengaged position. For example, the length of travel or displacement of the distal head portion 170 may be greater than or equal to about $1/32$ inch, greater than or equal to about $1/16$ inch, and greater than or equal to about $1/8$ inch, etc. and/or less than or equal to about 0.75 inches, less than or equal to about 0.5 inches, less than or equal to about 0.25 inches, etc.

In some embodiments, the gimbal apparatus 180 may include multiple gimbal fasteners 182 and multiple corresponding gimble resilient members 184. For example, the gimbal apparatus may include less than or equal to three gimbal fasteners, less than or equal to four gimbal fasteners, less than or equal to five gimbal fasteners, etc. that are, e.g., equally spaced apart from one another. Each of the multiple gimbal fasteners 182 (and corresponding gimbal resilient members 184) may move independent from one another. As a result, each of the gimbal fasteners 182 (and corresponding gimbal resilient member 184) may move by different amounts to align the distal head portion 170 with the surface 5 to be tested such that the distal head portion 170 and the surface 5 are flush with one another (e.g., regardless of the orientation of the housing 110).

In one or more embodiments, the head portion 150 and gimbal apparatus 180 may be surrounded or enclosed by a sleeve bellows (e.g., electrostatic discharge rubber bellows) extending between or connecting the proximal head portion 160 and the distal head portion 170. The bellows 156 may be configured to flex or provide flexibility between the proximal head portion 160 and the distal head portion 170 that move relative to one another while maintaining a sealed enclosure (e.g., to retain purge gas located within the head portion 150). In some embodiments, the bellows 156 (e.g., elastomeric) may define the gimbal resilient member 184 to create a flexible member between the proximal head portion 160 and the distal head portion 170 (e.g., compressing and restoring the bellows 156 to form the gimbal apparatus 180).

In one or more embodiments, the head portion 150 may include a gimbal detect board 168 positioned proximal of the proximal head portion 160. At least a portion of the gimbal apparatus 180 (e.g., a head 183 of the gimbal fastener 182) may contact the gimbal detect board 168 when the head portion 150 is in the disengaged position and the at least a portion of the gimbal apparatus 180 (e.g., the head 183 of the gimbal fastener 182) may be spaced apart from the gimbal detect board 168 when the head portion 150 is in the engaged position. In other words, the head 183 of the gimbal fastener 182 may translate in a direction parallel to the longitudinal axis 101 when the distal head portion 170 moves relative to the proximal head portion 160. As shown in FIGS. 5A-5B, the gimbal fastener 182 extends through an aperture 169 of the gimbal detect board 168 and the head 183 of the gimbal fastener 182 is dimensioned such that the head 183 does not pass through the gimbal detect board 168. When the head 183 of the gimbal fastener 182 moves away from the gimbal detect board 168 such that the head 183 is no longer contacting the gimbal detect board 168, an electrical circuit may be broken and, as a result, may indicate a gimballing effect of the gimbal apparatus 180 (e.g., the head portion 150 in the engaged position). Therefore, the breaking of an electrical circuit between the gimbal detect board 168 and the head 183 of the gimbal fastener 182 may signal that the OSEE apparatus 100 may be ready take a reading from the collector 190 because the head portion 150 is in the engaged position (and, e.g., properly aligned). In some embodiments, this signal produced by the head 183 moving away from the gimbal detect board 168 may result in the OSEE apparatus 100 automatically taking a reading from the collector 190. In other embodiments, it may result in producing an auditory or visual signal to the operator (e.g., indicating that the OSEE apparatus 100 is "ready") and the operator taking a reading from the collector 190 by pressing the initiation button 102 (e.g., to open the shutter 118 such that light can pass therethrough). In or more embodiments, the gimbal apparatus 180 may detect that the head portion 140 is in the disengaged position or the engaged position (and thereby potentially taking a reading from the collector 190) without any interaction between the gimbal fastener 182 and the gimbal detect board 168 (e.g., when the bellows 156 acts as a flexible member of the gimbal apparatus 180).

Further, in some embodiments, the head portion 150 may include a grid circuit board 152 positioned adjacent the first surface 192 of the collector 190 and a ground circuit board 154 adjacent the second surface 194 of the collector 190. The grid circuit board 152 may be electrically coupled to the collector 190 to transmit a sensed signal (e.g., from the collector 190 to the housing 110) in response to the received photoelectrons emitted from the surface 5. The head portion 150 may also include a conductive pin 155 extending from the grid circuit board 152 to the ground circuit board 154. The conductive pin 155 may be electrically connected to a housing circuit board 115 (e.g., see FIG. 4) located within the housing 110. The conductive pin 155 may be configured to transmit the sensed signal from the head portion 150 to the housing circuit board 115 and, e.g., thereon to the box 104 and the base station 106.

Figure 7:
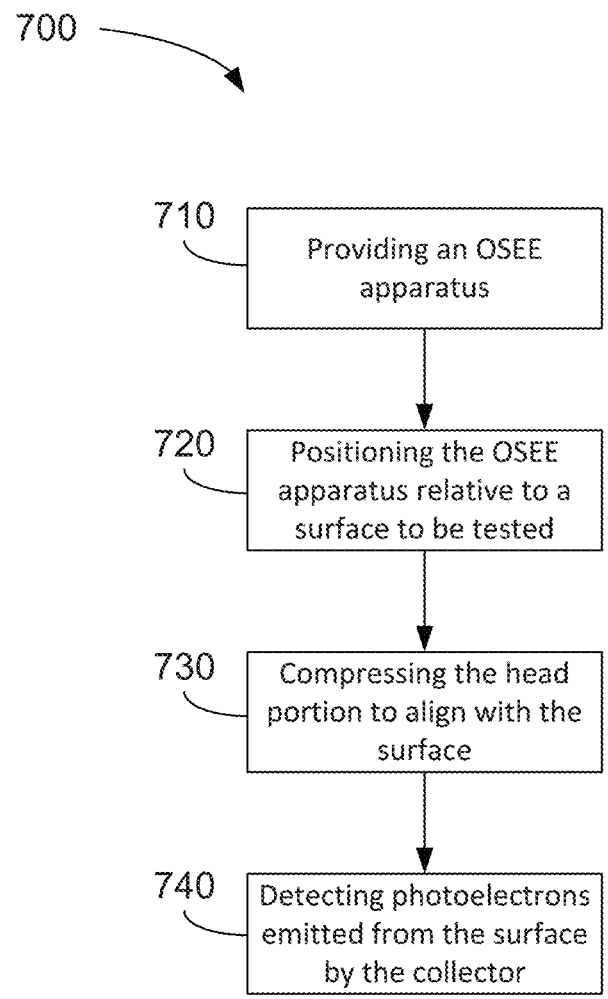
FIG. 7 is a method of detecting photoelectrons emitted from a surface using an OSEE apparatus including a movable head portion of a probe.

A method 700 of detecting photoelectrons emitted from a surface using an OSEE apparatus including a movable head portion of a probe is illustrated in FIG. 7. The method may include providing 710 the OSEE apparatus including the components as described herein. The method may also include positioning 720 the OSEE apparatus relative to a surface to be tested such that the distal head portion is proximate the surface. Further, the method may include compressing 730 the head portion to align the head portion with surface. For example, by applying a force on the head portion (e.g., by pressing onto the surface), the distal head portion may move towards the proximal head portion to help "self-right" the OSEE apparatus. As a result, the collector of the head portion may be properly aligned with the surface.

Additionally, the method may include detecting 740 photoelectrons emitted from the surface by the collector of the head portion. The photoelectrons may be emitted in response to a light from the light source impinging on the surface and the light source may impinge on the surface because a shutter opens to let light pass therethrough. In one or more embodiments, the shutter may open in response to the operator pressing the initiation button. Further, the shutter may be configured to open (e.g., by pressing the initiation button) only when the head portion is in the engaged position and may be restricted from opening (e.g., by pressing the initiation button) when the head portion is in the disengaged position. In other embodiments, the shutter may automatically open when the head portion is configured in the engaged position (e.g., indicating that the head portion is properly aligned). Also, in some embodiments, an auditory or visual indicator may be actuated when the head portion is in the engaged position and the collector is in the proper position.

All patents, patent documents, and references cited herein are incorporated in their entirety as if each were incorporated separately. This disclosure has been provided with reference to illustrative embodiments and is not meant to be construed in a limiting sense. As described previously, one skilled in the art will recognize that other various illustrative applications may use the techniques as described herein to take advantage of the beneficial characteristics of the system and methods described herein. Various modifications of the illustrative embodiments, as well as additional embodiments of the disclosure, will be apparent upon reference to this description.

What is claimed:

1. A probe for collecting optically stimulated electron emission to inspect a surface, the probe comprising:
    a body portion extending between a first end region and a second end region along a longitudinal axis and defining a passageway extending between the first end region and the second end region, wherein the passageway of the body portion is configured such that light from a light source travels along the passageway; and
    a head portion coupled to the first end region of the body portion, wherein the head portion comprises:
        a proximal head portion coupled to the first end region of the body portion, and
        a distal head portion configured to be positioned proximate the surface and movably coupled to the proximal head portion so as to move relative to the proximal head portion, wherein the distal head portion comprises a collector configured to detect photoelectrons emitted from the surface in response to the light from the light source impinging on the surface.

2. The probe of claim 1, wherein the distal head portion moves relative to the proximal head portion such that the collector is parallel with the surface.

3. The probe of claim 1, wherein the distal head portion is configured to move axially along the longitudinal axis relative to the proximal head portion.

4. The probe of claim 1, wherein the head portion further comprises a gimbal apparatus extending between the proximal head portion and the distal head portion, wherein the gimbal apparatus comprises:
    a gimbal fastener coupled to the distal head portion and configured to move through an aperture defined by the proximal head portion; and
    a gimbal resilient member extending between the proximal head portion and the distal head portion, wherein the gimbal apparatus is configured to allow the distal head portion to move relative to the proximal head portion.

5. The probe of claim 1, wherein the distal head portion comprises a foot block configured to directly contact the surface.

6. The probe of claim 1, wherein the collector defines a second surface facing the light source and a first surface, opposite the second surface, configured to face the surface, wherein the head portion comprises a grid circuit board adjacent the second surface of the collector and a ground circuit board adjacent the first surface of the collector, wherein the grid circuit board is electrically coupled to the collector to transmit a sensed signal in response to the received photoelectrons emitted from the surface.

7. The probe of claim 1, wherein an inner diameter of the passageway of the body portion of the probe is less than 1 inch.

8. The probe of claim 1, wherein the head portion further comprises a bellows extending between the proximal head portion and the distal head portion and configured to enclose the head portion.

9. An apparatus for inspecting the surface, the apparatus comprising:
    the probe of claim 1; and
    a housing defining an interior cavity and extending along a longitudinal axis, the housing comprising,
        the light source disposed within the interior cavity and configured to direct light along the longitudinal axis, and
        a shutter positioned away from the light source along the longitudinal axis and configured to selectively allow light from the light source pass therethrough, wherein the light from the light source travels along the passageway when the shutter allows light from the light source to pass therethrough.

10. An apparatus for inspecting a surface, the apparatus comprising:
    a housing defining an interior cavity and extending along a longitudinal axis, the housing comprising,
        a light source disposed within the interior cavity and configured to direct light along the longitudinal axis, and
        a shutter positioned away from the light source along the longitudinal axis and configured to selectively allow light from the light source pass therethrough; and a probe coupled to and extending from the housing away from the shutter of the housing, wherein the probe comprises:
- a body portion extending between a first end region to a second end region and defining a passageway between the first end region to the second end region, wherein the passageway of the body portion is configured such that light from the light source travels along the passageway when the shutter allows light from the light source to pass therethrough; and
- a head portion coupled to the first end region of the body portion, wherein the head portion comprises a collector configured to detect photoelectrons emitted from the surface in response to the light from the light source impinging on the surface, wherein the head portion is configurable between an engaged position when the head portion is engaged with the surface and a disengaged position when the head portion is disengaged with the surface, wherein the shutter is configured to be opened when in the engaged position and the shutter is restricted from opening when in the disengaged position, wherein the head portion further comprises:
- a proximal head portion coupled to the first end region of the body portion, and
- a distal head portion configured to be positioned proximate the surface and movably coupled to the proximal head portion so as to move relative to the proximal head portion, wherein the proximal head portion is closer to the distal head portion when the head portion is in the engaged position than when in the disengaged position.

11. The apparatus of claim 10, wherein the head portion further comprises a gimbal detect board positioned proximal of the proximal head portion and a gimbal apparatus extending between the proximal head portion and the distal head portion, wherein the gimbal apparatus is configured to allow the distal head portion to move relative to the proximal head portion, wherein at least a portion of the gimbal apparatus contacts the gimbal detect board when the head portion is in the disengaged position and the at least a portion of the gimbal apparatus is spaced away from the gimbal detect board when the head portion is in the engaged position.

12. The apparatus of claim 10, wherein the shutter opens automatically in response to the head portion being configured in the engaged position.

13. The apparatus of claim 10, wherein an inner diameter of the passageway of the body portion of the probe is less than 1 inch.

14. The apparatus of claim 10, further comprising an initiation button configured to be pressed to actuate the shutter, wherein the shutter opens to allow light to pass through to the probe when the initiation button is pressed and the head portion is in the engaged position and the shutter is restricted from opening when the initiation button is pressed and the head portion is in the disengaged position.

* * * * *